Sept. 29, 1959     J. L. MOSSEY     2,906,375
BRAKE ASSEMBLY

Original Filed Dec. 12, 1952     2 Sheets-Sheet 1

INVENTOR.
JOSEPH L. MOSSEY
BY Cecil J Arens
ATTORNEY

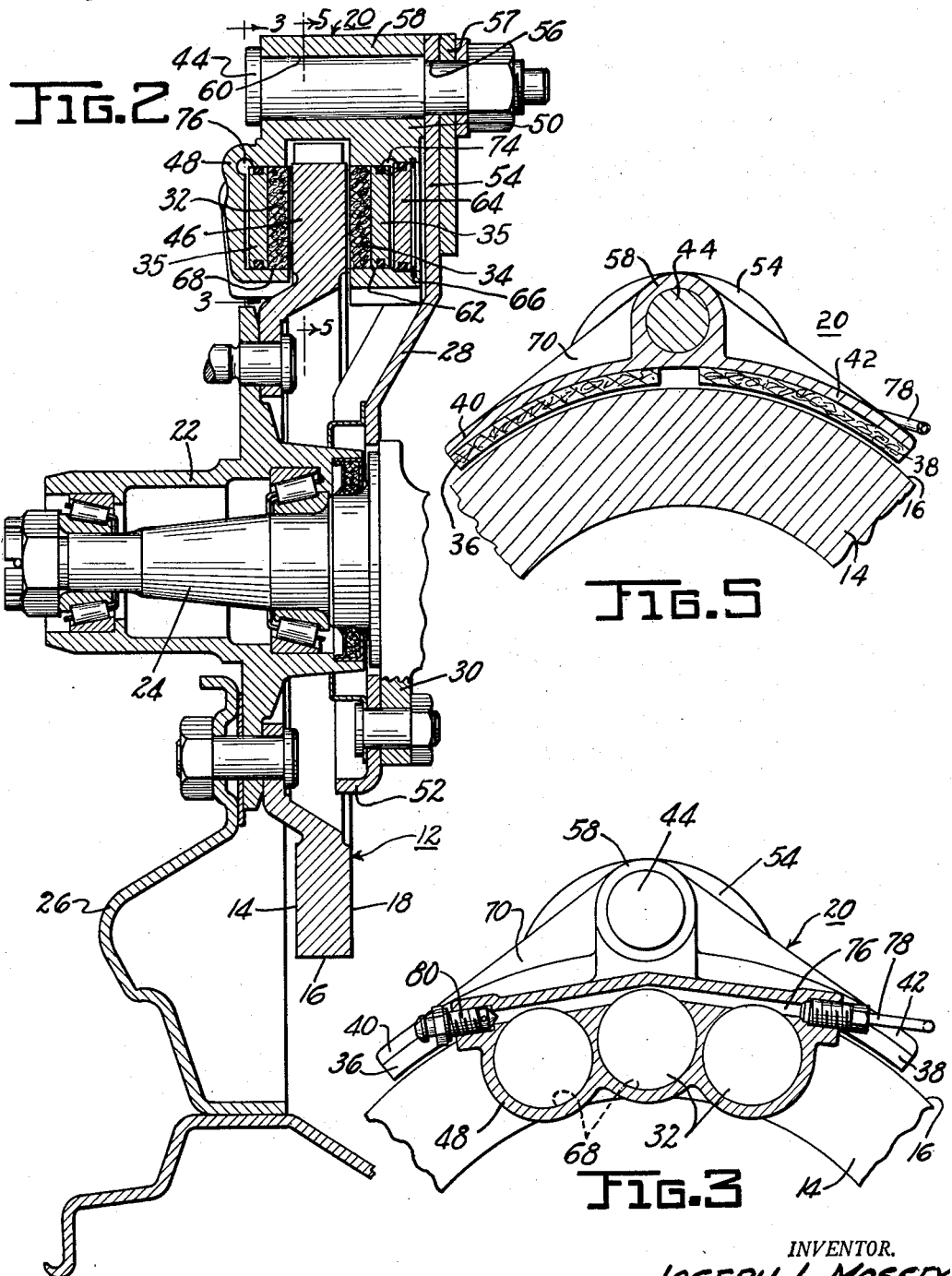

United States Patent Office 2,906,375
Patented Sept. 29, 1959

2,906,375

BRAKE ASSEMBLY

Joseph L. Mossey, South Bend, Ind., assignor to Bendix Aviation Corporation, South Bend, Ind., a corporation of Delaware Continuation of abandoned application Serial No. 325,674, December 12, 1952. This application September 6, 1956, Serial No. 608,655

19 Claims. (Cl. 188—70)

This invention relates to a brake assembly having either or both of the following attributes: engagement of one friction means is brought about as the result of engagement of another friction means and/or a plurality of rotor surfaces are engaged by friction means associated with a single stator unit.

This application is a continuation-in-whole of my parent application Serial No. 325,674, filed December 12, 1952, now abandoned.

An important object of this invention is to combine in a single brake assembly the best operating features of disc and drum (or shoe) brakes, obtaining the self-energization inherent in certain types of drum brakes, while avoiding the loss of pedal travel which results from drum expansion in conventional drum brakes.

Another important object of this invention is to obtain improved heat dissipation from the brake elements, with a consequent significant reduction of "fade" (i.e. loss of brake effectiveness). This is accomplished primarily as a result of an appreciable increase in the swept rotor area, obtained by utilizing both disc and cylindrical friction areas.

Among the other advantages obtained by using the present invention are: (a) increase of pedal ratio or decrease of pedal stroke made possible by reduced fluid displacement in the hydraulic actuator; (b) elimination of the need for initial brake adjustment; and (c) economical realization of the foregoing objects and advantages by means of a simple low-cost construction.

The braking art has utilized among others two distinct types of brakes—the "drum" (or "shoe") brake and the "disc" brake. Each of these distinct types has characteristic advantages which have determined the particular type used in a given instance. But the choice of one of these types is usually at the cost of foregoing the advantages of the other. Generally, the desirable characteristics of the disc brake are: low pedal travel loss during the brake application; better heat dissipation with resultant reduction of the tendency to "fade," and simplication of the brake adjustment mechanism. On the other hand, the drum brake has the advantage of being able to provide greater self-energization, and therefore increased torque absorption for a given cost. While this is a very generalized listing of the broad characteristics of the two different types of brakes it will be sufficient to emphasize the desirability of having the advantages of both types of braking effect in a single unit.

Part of the improvement of my brake operation results from using a greater swept rotor area; i.e., the area of the rotating member contacted by friction elements is increased by using both cylindrical and disk surfaces of the same rotor. The arrangement is such that the rotor has oppositely facing disk friction surfaces which are engaged by oppositely urged friction elements. With this arrangement lateral loads are self-cancelling within the rotor and stator members, and no axial loads are placed on the bearings by the brake-applying forces.

The above and other objects and features of the invention will appear more fully hereinafter from a consideration of the following description, taken in connection with the accompanying drawings, wherein an embodiment of the invention is illustrated by way of example. In the drawings:

Figure 2 is a sectional view of the brake mechanism taken along line 2—2 of Figure 1;

Figure 3 is a fragmentary sectional view of the friction element taken along line 3—3 of Figure 2;

Figure 5 is a fragmentary sectional view of the stator unit taken along line 5—5 of Figure 2.

Figure 1:
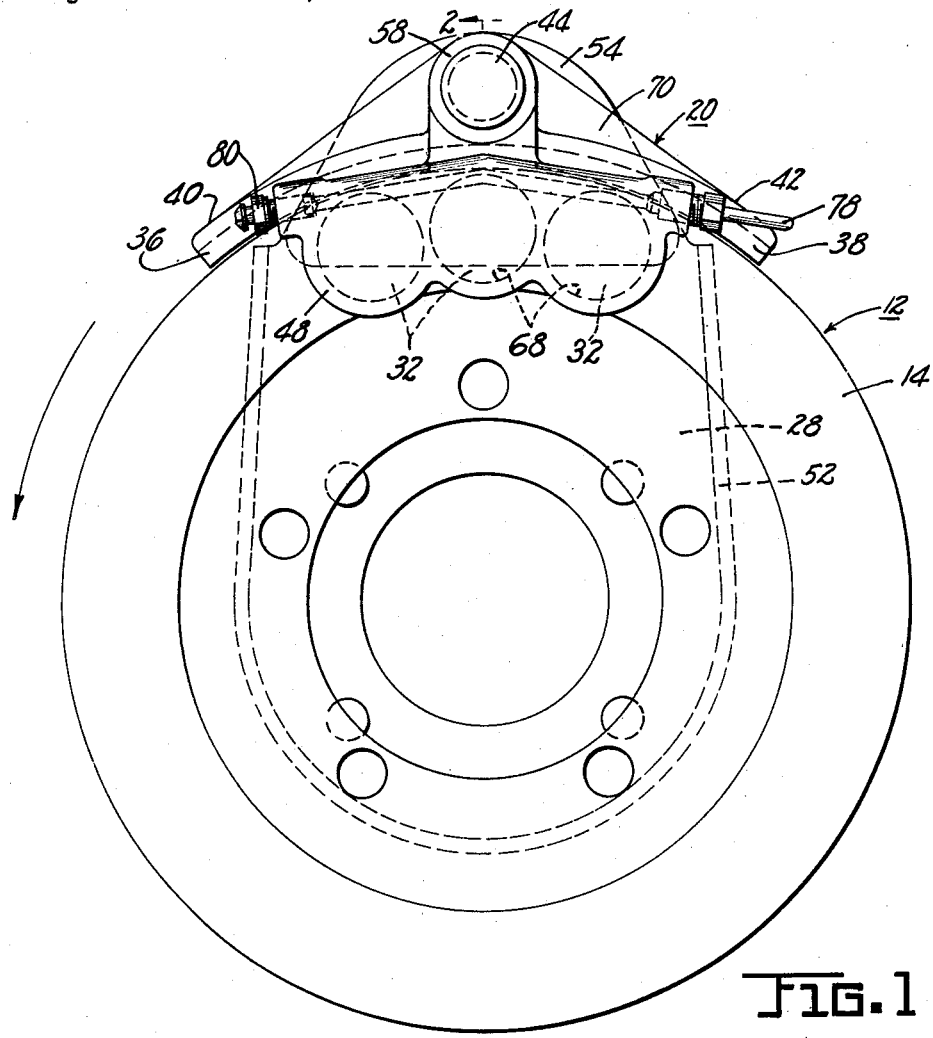
Figure 1 is a side elevation of a brake mechanism which embodies my invention.

The brake disclosed in the drawings has a rotor designated generally by reference numeral 12 having friction surfaces 14, 16, and 18, each of which is adapted to be engaged by a separate friction element associated with a stator unit designated generally by reference numeral 20. Surfaces 14 and 18, as shown, are plane or disk surfaces, and surface 16, as shown, is a cylindrical surface. The rotor 12 is shown secured to and rotatable with a hub 22 which is rotatably supported on the spindle 24, which further serves as a mounting member for a wheel 26. The stator element 20 is carried by a supporting member 28 which is secured to a non-rotating member, such as the flange 30 on the spindle 24.

The disk surface 14 forming one side of the rotor 12 is adapted to be engaged by one or more friction elements 32, three such elements being shown in the illustrated design. The disk surface 18 forming the other side of rotor 12 is adapted to be engaged by one or more friction elements 34, three such elements being shown in the illustrated design. A piston member 35 is associated with each of the friction elements 32 and 34, and is adapted to move axially under the influence of hydraulic pressure. The cylindrical surface 16 of rotor member 12 is adapted to be engaged by one or more friction elements 36 and 38, which are carried by the circumferentially extending portions 40 and 42 of the stator element 20. As shown, the entire stator element 20 is pivotally mounted on anchor member 44 which is secured to the non-rotatable support member 28. The arrangement is such that the initial engagement of friction elements 32 and 34 with the disk surfaces 14 and 18 of rotor 12 causes a resultant pivotal movement of the stator unit 20 about anchor member 44, thereby bringing one or the other of the friction elements 36, 38 into engagement with the cylindrical surface 16 of rotor 12.

The rotor 12 extends radially outwardly from the hub 22 and has an annular portion 46 rotatable between two radially extending sides 48 and 50 of the stator unit 20. The annular portion 46 of the rotor which is rotatable between the two sides 48 and 50 is axially thickened to give additional strength and to provide a periphery 16 having considerable width in order to obtain sufficient area for engagement with brake shoe elements 36 and 38 of the stator member 20.

A flange 52 is formed along the perimeter of the torque reaction member 28 to give sufficient rigidity for transmitting high torque loads to the spindle 24. The torque reaction member 28 is axially offset in the same manner as the rotor 12 and is formed with a flat portion 54 substantially parallel to that part of the rotor lying between the two extending sides 48 and 50 of the stator unit 20.

As best seen in Figure 2, the upper end of the flat portion 54 of the torque reaction member 28 is provided with an opening 56 through which extends a reduced diameter section of the anchor member 44. A reinforcing plate such as member 57 is also received on the reduced diameter section of the anchor member 44 to stiffen the torque reaction member 28.

The pivotal stator unit 20 contains an axially extending cylindrical boss 58 formed at the top of the unit. The cylindrical boss 58 has an axially extending centrally located bore 60 through which extends the anchor member 44 so as to pivotally support the unit 20. The stator unit 20 is symmetrical about a plane containing the axes of the spindle and the bore 60, which makes for balance of the unit about its support.

Each cylinder bore 62 in the side 50 of the stator is sealed at one end by a combination of a circular plug member 64 and a snap ring 66. The shoe brake elements 36 and 38 of the stator unit 20 are disposed at opposite ends of the stator member and a strengthening web 70 is provided between the arcuate rim portion of the shoe elements 36, 38 and the axially extending cylindrical boss 58 for stiffening the shoe brake elements.

Figure 4:
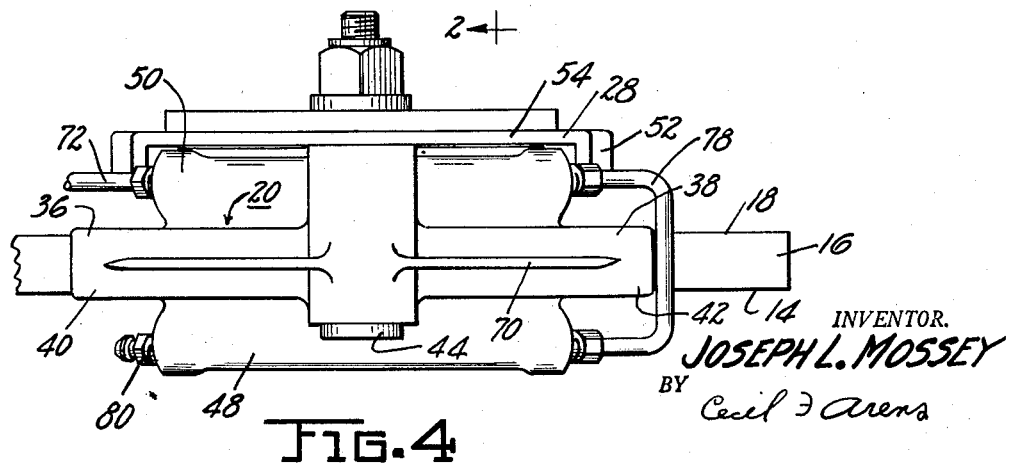
Figure 4 is a top view of Figure 1 with a part of the rotatable disk cut away.

As best shown in Figures 3 and 4, the hydraulic system for actuating the friction elements 32 and 34 consists of an inlet port 72, passages 74 and 76 communicating with the bores 62 and 68 in the sides 48 and 50, conduit means 78 connecting the respective passages, and a bleed port 80.

In operation, fluid from a master cylinder (not shown) will be transmitted through the inlet port 72 and the passages 74 and 76 to exert actuating pressure against each of the axially reciprocable friction elements 32 and 34. The friction elements 32 and 34 are thus forced into engagement with the opposite faces 14 and 18 of the annular portion 46 of the rotor 12.

It will be noted from Figure 2 that the axial brake applying force exerted by friction elements 34 mounted in the side 50 is opposed by an equal and oppositely acting force exerted by friction elements 32 in the side 48; the result is that the lateral loads are self-cancelling within the rotor and stator members. The friction elements 32 and 34 acting on opposite faces 14 and 18 of the rotor 12 exert a compressive action on the latter but there is no resultant axial thrust of the motor on the bearings in either direction, nor is there any net axial load on the mounted portion of the stator unit 20. These are important considerations because if there had been no allowance made for balancing these axial loads they would have to be taken through a wheel bearing or like member, and also such offset loading would introduce complicating torque loads on the stator unit.

Assuming rotor rotation in the direction of the arrow in Figure 1, engagement of the friction elements 32 and 34 with the opposite faces 14 and 18 of the rotor 12 will produce a moment about the anchor member 44, whereby causing clockwise rotation of the stator unit 20. This clockwise rotational movement of the unit 20 will radially apply the right hand shoe brake element 38 against the periphery 16 of the rotor 12. The torque effect on the anchor member 44 is transmitted through member 28 to the spindle 24. The anchor member 44 serves the dual function of providing pivotal support for the stator unit 20 and acting as the anchoring means for the stator unit. From a consideration of the braking operation it is apparent that the brake shoe elements are applied by the braking torque developed by the friction elements 32 and 34. That is, the force which tends to apply the shoe friction element is produced by pivoting of the stator unit under the influence of the braking torque of the disk friction elements.

Assuming rotor rotation in the direction opposite to that indicated by the arrow, a brake application will induce a counterclockwise movement of the stator unit, radially applying the left-hand shoe brake element 36.

Since the applying force exerted by either of the shoe elements 36 and 38 against the rotor periphery is produced by contact of the disk elements 32 and 34 with the opposite faces of the rotor 12, the shoe elements will disengage the periphery of the rotor when the pressure in the cylinder bores is released. In view of the symmetrical design of the friction unit 20, a return spring is not required to disengage the shoe elements after the hydraulic pressure is relieved. The disk friction elements are illustrated as free-floating, thus making an adjustment mechanism unnecessary. Obviously, return springs may be provided for both the disk friction elements and the shoe friction elements, if desired.

From a consideration of the foregoing description it is apparent that I have secured the objects hereinbefore enumerated.

Moreover, the pedal characteristics of the brake are related only to movement of the disk elements 32 and 34 into frictional engagement with the rotor 12, thus eliminating pedal travel loss due to mechanical and thermal distortion of the rotor.

The stator unit 20 is highly effective because of the self-energizing characteristic of the shoe elements 36 and 38. This effectiveness of the shoe elements is obtained without their adversely influencing the pedal characteristic.

The rotor 12 has three distinct surfaces 14, 16, and 18 engageable with oppositely facing friction elements carried by the brake unit 20 so as to utilize the greatest possible sweep rotor area. Because of this wide swept rotor area the operating temperatures are drastically reduced, thus preventing deterioration of the lining on the disk brake elements 32 and 34 and the lining 36 on the shoe elements 36 and 38. Because of this reduction in operating temperatures, I eliminate "fade," and maintain complete controllability.

Although only one embodiment of the invention has been illustrated and described, various changes in the form and relative arrangement of the parts may be made to suit requirements.

I claim:

1. For use in cooperation with a member rotatable about an axis and having a cylindrical surface and oppositely facing disk surfaces, a brake comprising a member mounted for pivotal movement on an axis parallel to the axis of said rotatable member, said pivoted member having a friction surface adapted to be brought into engagement with the cylindrical surface of the rotatable member, friction elements carried by said pivoted member and movable in a direction parallel to said first mentioned axis to engage the oppositely facing disk surfaces of said rotatable member thereby producing movement of the pivoted member to bring its friction surface into engagement with the rotatable member, and piston means movable along a line parallel to said first mentioned axis to cause actuation of said friction elements.

2. For use in cooperation with a rotatable member having oppositely facing disk surfaces, a brake comprising a unit mounted for pivotal movement on an axis parallel to the rotative axis of said rotatable member, said unit having an arcuate friction-surface rim portion and reciprocable friction elements adapted to engage the oppositely located disk surfaces thereby producing movement of the pivoted unit to bring said rim portion into engagement with the rotatable member, and fluid pressure means carried in said unit for simultaneously actuating said reciprocable friction elements.

3. In cooperation with a rotatable member having three friction-element-engaging surfaces, a brake comprising an anchor means having an axis parallel to the rotative axis of said rotatable member, a member pivotally mounted on said anchor means for rotation about said axis, at least one pair of oppositely actuated piston members reciprocably received in said pivotally mounted member, and a brake shoe portion of said pivotally mounted member adapted to engage a surface of the rotatable member when the piston members produce friction contact with said rotatable member to produce an actuating moment about said anchor means thereby pivoting said support member.

4. In cooperation with a rotatable member, a brake unit pivotally supported on an axis parallel to the axis of rotation of said rotatable member, said pivotal support being located beyond the outer periphery of said rotatable member, a plurality of piston members reciprocably mounted in said unit for movement parallel to said axis of rotation into engagement with opposite sides of said rotatable member, and arcuate brake shoe portions carried by said brake unit and adapted to engage the outer periphery of said rotatable member when a moment is produced about the pivotal support by the engagement of said piston members with opposite sides of said rotatable member.

5. In cooperation with a rotatable member having at least two friction-element-engaging surfaces in different planes, one of said surfaces being substantially cylindrical, a brake comprising an anchor means, a friction unit pivotally associated with said anchor means on an axis parallel to the rotative axis of said rotatable member, at least one piston member reciprocably received in said unit for engagement with the other surface of said rotatable member, and a brake shoe portion of said unit adapted to engage the cylindrical surface of the rotatable member when the piston member contacts said rotatable member to produce an actuating moment about said anchor means.

6. For use in cooperation with a rotatable member having a cylindrical surface and disk surfaces, a brake comprising a member pivoted on an axis parallel to the axis of rotation of said rotatable member and having a friction element adapted to be brought into engagement with the cylindrical surface of the rotatable member, and pistons operatively connected to said pivoted member and movable along a line parallel to the axis of rotation of said rotatable member to engage oppositely facing disk surfaces of the rotatable member thereby producing movement of the pivoted member to bring its friction surface into engagement with the rotatable member.

7. A brake comprising a rotor having two oppositely facing parallel disk friction surfaces and a cylindrical friction surface located on the outer periphery of and normal to the two disk friction surfaces, a stator unit supported on a nonrotatable member for pivotal movement about an axis parallel to the rotative axis of said rotor, said stator unit carrying an arcuate friction element fixedly secured thereto which is pressed against the cylindrical friction surface of the rotor when the stator unit is pivoted, at least two friction elements carried by the stator unit and movable along a line parallel to said rotative axis, said two friction elements being adapted to be pressed against the oppositely facing disk friction surfaces of the rotor, the frictional engagement of the second mentioned friction elements with the rotor causing pivotal movement of the stator unit which brings the arcuate friction element also into engagement with the rotor, and piston members carried in said stator unit in one or more bores extending parallel to said rotative axis, said piston members being subjected to hydraulic pressure to actuate the second mentioned friction elements.

8. A brake comprising a rotor having two oppositely facing parallel disk friction surfaces and a cylindrical friction surface, a stator unit supported on a nonrotatable member for pivotal movement about an axis parallel to the rotative axis of said rotor, said stator unit carrying an arcuate friction element fixedly secured thereto which is pressed against the cylindrical friction surface of the rotor when the stator unit is pivoted, at least two friction elements carried by the stator unit and movable along a line parallel to said rotative axis, said two friction elements being adapted to be pressed against the oppositely facing disk friction surfaces of the rotor, the frictional engagement of the second mentioned friction elements with the rotor causing pivotal movement of the stator unit which brings the arcuate friction element also into engagement with the rotor, and hydraulic pressure means acting along a line parallel to said rotative axis to actuate the second mentioned friction elements.

9. A brake comprising a rotor having two oppositely facing disk friction surfaces and a cylindrical friction surface, a stator unit supported on a nonrotatable member for pivotal movement about an axis parallel to the rotative axis of said rotor, said stator unit carrying a friction element fixedly secured thereto and pivotal with said stator unit about said nonrotatable member which is pressed against the cylindrical friction surface of the rotor when the stator unit is pivoted, at least two additional friction elements carried by the stator unit, said stator unit operatively connecting said friction elements and providing independent movement of said additional friction elements relatively to said stator unit, said additional friction elements being adapted to be pressed against the oppositely facing disk friction surfaces of the rotor, said stator unit acting as a carrier common to both said friction element and said two additional friction elements whereby said friction element and said two additional friction elements are pivoted concomitantly about the pivot axis of said stator unit, the frictional engagement of said additional friction elements with the rotor causing movement of the stator unit which brings the first friction element also into engagement with the rotor, and hydraulic pressure means for actuating said additional friction elements.

10. A brake comprising a rotor having a disk friction surface and a cylindrical friction surface, a stator unit supported on a nonrotatable member for movement in a plane perpendicular to the rotative axis of said rotor, said stator unit carrying a friction element fixedly secured thereto and pivotal with said stator unit about said nonrotatable member said friction element being pressed against the cylindrical friction surface of the rotor when the stator unit is moved from its released position, and an additional friction element carried by the stator unit and adapted to be pressed against the disk friction surface of the rotor, said stator unit operatively interconnecting said friction element and additional friction element and providing independent movement of said additional friction element relatively to said stator unit, said additional friction element having a line of motion perpendicular to the plane in which the stator unit moves, the frictional engagement of said additional friction element with the rotor causing movement of the stator unit which brings the first friction element also into engagement with the rotor.

11. For use in cooperation with a rotatable member having three friction-element-engaging surfaces, a composite disk and drum brake comprising a torque reaction member, a friction unit mounted on said torque reaction member for pivotal movement on an axis parallel to the rotative axis of said rotatable member, said friction unit having a pair of side plates spaced from one another in a direction parallel to said rotative axis and extending radially with respect to said axis, and an arcuate friction-material-lined rim normal to said side plates and located adjacent the cylindrical surface of said rotatable member, at least one cylinder bore located in each of said side plates and extending toward the surfaces of said rotatable member in a direction parallel to said rotative axis, piston members reciprocably received in said bores, a friction pad interposed between the end of each of the piston members and the associated surface of said rotatable member, and conduit means communicating with said cylinders for transmitting fluid under pressure to move said piston members and friction pads into engagement with the associated surfaces of said rotatable member and thereby produce pivotal movement of said friction unit to apply one end of said arcuate rim into engagement with the adjacent surface of said rotatable member.

12. A device for braking a member mounted for rotation about an axis, said device comprising a substantially U-shaped cross-section housing mounted for pivotal movement about an anchor member, two of the sides of said housing extending along opposite faces of said rotatable member, and at least one piston member reciprocably mounted in each of said extending sides to effect frictional engagement with said rotatable member, the portion of said housing interconnecting said sides having a friction surface located adjacent the periphery of said rotatable member, said housing being pivoted about said anchor member and operative to actuate said friction surface radially with respect to said axis into contact with said periphery upon frictional engagement produced by said piston members with the opposite faces of said rotatable member.

13. A brake for use with a disk member mounted for rotation about an axis, said brake comprising a brake unit straddling said disk member and mounted for pivotal movement on an axis parallel to said rotative axis, at least one free-floating piston member received in said brake unit on each side of said disk member, actuating means connected to said free-floating piston member for actuating the same into frictional contact with the corresponding side of said disk member, and a pair of arcuate shoe brake elements, one on each end of said unit and movable with the unit to engage the periphery of said rotatable disk member in response to a moment produced about said pivotal support by frictional contact of said free-floating piston members with said disk member.

14. A brake for use with a rotatable member mounted for rotation about an axis comprising a composite disk and brake shoe unit, said unit comprising a member mounted for pivotal movement on an axis parallel to the axis of rotation of said rotatable member, a shoe friction element carried on said pivotally mounted member adjacent said rotatable member for pivotal movement thereagainst, two disk friction elements carried by said pivotally mounted member and adapted for movement into frictional engagement with the sides of said rotatable member by opposed movement on a line parallel to the rotative axis of said rotatable member thereby causing said shoe element to pivot, means interconnecting the axially applied friction elements and shoe friction element and providing independent movement of said axially applied friction elements, and a common anchor means for said shoe and disk elements.

15. In a brake, the combination of first friction elements adapted for opposed actuation and movable in a plane perpendicular to their line of actuation, a second friction element, means connecting said first friction elements with said second friction element for maintaining a predetermined fixed spaced relationship therebetween in said plane of movement of said first friction elements and anchoring member for said second friction element about which said second friction element is turned on an axis parallel to the line of actuation of said first friction elements by movement of said first friction elements perpendicular to their line of actuation, and a hydraulic motor mounted parallel to the line of actuation of said first friction elements to produce actuation thereof.

16. A brake assembly comprising a rotatable member and braking means extending over only a portion of the braking surfaces of said rotatable member, said braking means comprising a housing having portions extending adjacent each braking surface of the rotatable member and in fixed axial relation thereto, said housing being mounted for pivotal movement on an axis parallel to and fixed against rotation about the rotative axis of said rotatable member, first friction members, at least one on each side of said rotatable member, each movable to bring its frictional surface into engagement with said rotatable member and thereby cause said housing to pivot, means for forcing each of said first friction members into frictional engagement with the adjacent braking surfaces of the rotatable member, and second friction members operatively connected to said housing in such a way that pivotal movement of said housing applies said second friction members into engagement with said rotatable member.

17. A braking device for a member mounted for rotation about an axis, said device comprising a stator straddling a periphery of said rotatable member and extending over only a portion of the braking surfaces thereof, said stator having portions extending adjacent each braking surface of the rotatable member and in fixed axial relation thereto, said stator being mounted for pivotal movement on an axis parallel to said rotative axis, first friction means carried by said stator adjacent the braking surfaces of said rotatable member and movable into engagement with said surfaces, the torque developed from said frictional engagement causing said stator to pivot, and second friction means located adjacent the braking surfaces of said rotatable member and operatively connected to said stator and applied by pivotal movement of said stator.

18. A brake comprising a rotor having substantially flat spaced-apart surfaces and a cylindrical surface rim portion, first friction elements acting along a line perpendicular to said flat surfaces and engageable with said surfaces, a fluid motor operatively connected to each of said first friction elements and operative to engage said friction elements with said flat rotor surfaces, second and third arcuate friction elements positioned adjacent said arcuate rim portion and engageable therewith, and means pivotally mounted on an axis perpendicular to said flat rotor surfaces operatively connected to said first friction elements and said second and third friction elements such that movement of the first friction elements in one direction in a plane parallel to said flat rotor surfaces produces a moment about said axis which forces said second friction element into engagement with said cylindrical rim portion and movement in the opposite direction produces said moment which forces said third friction element into engagement with said cylindrical rim portion.

19. A brake comprising a rotor having two substantially flat spaced-apart surfaces and a cylindrical rim portion connecting said flat surfaces, a first friction element positioned adjacent one of said two flat surfaces, a second friction element positioned adjacent the other of said two flat surfaces, a fluid motor operatively connected to each of said first and second friction elements for actuating said first and second friction elements into engagement with the corresponding flat surface adjacent thereto, third and fourth arcuate friction elements positioned adjacent said cylindrical rim portion, an anchor member extending along an axis parallel to the rotative axis of said rotor, and means rotatably mounted on said anchor member operatively connected to said first, second, third and fourth friction elements whereby movement of said first and second friction elements in one direction in a plane parallel to said flat surfaces produces a moment about said anchor member which forces said third arcuate friction element only into engagement with said cylindrical rim portion and movement of said first and second friction elements in the opposite direction produces an opposite moment which forces said fourth arcuate friction element only into engagement with said cylindrical rim portion.

References Cited in the file of this patent

UNITED STATES PATENTS

| | | |
|---|---|---|
| 2,359,760 | Helsten | Oct. 10, 1944 |
| 2,359,805 | Tack | Oct. 10, 1944 |
| 2,751,046 | Tack | June 19, 1956 |